United States Patent
Teeple, Jr.

[11] Patent Number: 5,807,316
[45] Date of Patent: Sep. 15, 1998

[54] METHOD AND APPARATUS FOR PREPARING AND ADMINISTERING INTRAVENOUS ANESTHESIA INFUSIONS

[76] Inventor: Edward Teeple, Jr., 641 Ridgefield Ave., Pittsburgh, Pa. 15216

[21] Appl. No.: 783,065

[22] Filed: Jan. 15, 1997

Related U.S. Application Data

[63] Continuation-in-part of Ser. No. 232,502, Apr. 25, 1994, which is a continuation of Ser. No. 986,189, Dec. 7, 1992, abandoned, which is a continuation-in-part of Ser. No. 802,963, Dec. 6, 1991, abandoned.

[51] Int. Cl.$^6$ .................................................... A61F 13/00
[52] U.S. Cl. ............................................. 604/51; 128/898
[58] Field of Search .......................... 128/DIG. 13, 898; 604/151, 49, 51, 67, 80, 903

[56] References Cited

U.S. PATENT DOCUMENTS

| | | | |
|---|---|---|---|
| 4,741,732 | 5/1988 | Crankshaw et al. | 604/50 |
| 4,898,578 | 2/1990 | Rubalcaba, Jr. | 604/66 |
| 4,943,279 | 7/1990 | Samiotes et al. | 604/151 |
| 5,395,340 | 3/1995 | Lee | 604/151 |
| 5,409,456 | 4/1995 | Crankshaw | 604/50 |

*Primary Examiner*—Mark O. Polutta
*Assistant Examiner*—Dennis Ruhl
*Attorney, Agent, or Firm*—Titus & McConomy

[57] ABSTRACT

The present invention relates to a method of preparing and administering one or more drug solutions for continuous infusion. Flow rates are standardized by varying the drug concentrations according to a pre-established set of tables. The method of the present invention greatly simplifies clinical application of continuous infusion anesthesia and allows easy preparation of different volumes which can minimize drug wastage. The standardization of rate taught by the present method eases interpretation and mixing, resulting in easier application of drugs and increased patient safety. An apparatus is desirably used to assist in achieving the objectives of the present invention. The device facilitates accurate and efficient conversion to the nonstandard flow rates required for special applications such as neonatal anesthesia and others. A computerized mix controller coupled with a computer capable of performing the mixing determination with the necessary operator inputs can mix and dispense the final drug solution into a ready-to-use infusion bag. Users of the method and computer may easily convert to the selection of nonstandard flow rates required for special situations such as neonatal anesthesia where low flow rates may be required. Pre-measured amounts of anesthetic drugs may be dispensed manually or using the computerized mix controller, resulting in increased safety to patients due to the standardized drug amounts would be prepared by the manufacturer.

23 Claims, 12 Drawing Sheets

VISUAL GUIDE FOR CONTINUOUS INTRAVENOUS INFUSION RATES

| AGENT | Lower Limit | Low MIR      Mls/Hour      High MIR |
|---|---|---|
| | | 0   3   6   9   12   15   18   21   24   27   30 |
| Thiopental | 7.5 | |
| Methohexitol | 7.5 | |
| Etomidate | 6 | |
| Propofol | | |
| Morphine | 3 | |
| Meperidine | 4.5 | |
| Fentanyl | 1.7 | |
| Sufentanil | 3 | |
| Alfentanil | 3 | |
| Ketamine | 6 | |
| Midazolam | 1.6 | |

Infusion Rate Ranges (Mls/Hr)       Propofol not included

☐ IBelow Recommended nfusion Rate

MIR = MAINTENANCE INFUSION RATE

A Mixed Bag Corporation

Name _____
Date _____ Pt ID# _____
Weight _____ lbs kg
Drug _____
Use   iv sed/analg   $N_2O$ suppl   primary
ug/kg/min _____
duration _____ hour
mls/hour _____ max rate
Volume Bag _____ ml
mls to remove and replace with
drug _____ ml
mg drug in bag _____ mg ug
        Bag Mixed By _____

Figure 5

METHOD AND APPARATUS FOR PREPARING AND ADMINISTERING INTRAVENOUS ANESTHESIA INFUSIONS

CROSS REFERENCE

This is a continuation-in-part application of U.S. patent application Ser. No. 08/232,502, filed Apr. 25, 1994, which is a continuation of U.S. patent application Ser. No. 07/986,189 filed Dec. 7, 1992, now abandoned, which is a continuation-in-part of U.S. patent application Ser. No. 07/802,963, filed Dec. 6, 1991, now abandoned.

FIELD OF THE INVENTION

The present invention relates to a method and apparatus for preparing solutions of drugs for continuous infusion into a patient, and especially to an improved, cost-effective and reliable method and apparatus for use by qualified physicians and other specialists in which the amount of drug required is determined on the basis of a standardized infusion rate.

BACKGROUND OF THE INVENTION

Many classes of intravenous agents can be used in the treatment of medical patients, such as general anesthesia or inhalational anesthetic supplements; neuromuscular blocking drugs; cardioresuscitative drugs for critical care applications; and many others. Anesthesiologists often employ one or more drugs for continuous infusion techniques. However, the current methods and mechanisms that exist for the intravenous infusion of a variety of drugs, in particular anesthetic drugs, are plagued with a variety of deficiencies as described herein.

Prior Methods of Anesthetic Administration

The practice of infusing a variety of drugs may be cumbersome and difficult because of the large number of variables involved and the difficulty of remembering each important factor involved in administering one drug or a combination of drugs. Historically, anesthesiologists have relied on memory when attempting to determine the proper dose ranges for anesthetic drugs in a variety of medical conditions. Many practitioners have selected only one or two agents to simplify the otherwise complex formulas that must be used, and memorize the administration requirements related to these one or two specific agents. Unfortunately, limiting the number of drugs in an anesthesiologist's repertoire may severely limit an anesthesiologist's ability to tailor anesthesia to the particular needs of a patient.

Furthermore, the anesthesiologist's memory is based on experience, reading recommended dose ranges in the Physicians Desk Reference ("PDR"), reading recommended dose ranges in the literature, and interactions with representatives from drug companies. Unfortunately, the safe drug ranges recommended by the these sources are inconsistent and large discrepancies exist among them for the recommended ranges. See FIG. 1, a schematic representation of the dose ranges recommended by various literature sources. The suggested ranges also do not reflect consideration of particular applications that require significant adjustments in the dosage and rate of administration, e.g., cardiac cases.[1] Further, safe ranges for anesthetic medications vary depending on what modality is used to administer the anesthesia. Nonetheless, the safety ranges described in the standard sources for anesthetic medications do not reflect consideration for the delivery modality of the anesthesia. For example, with respect to certain drugs, the PDR does not adjust the recommended ranges when total intravenous anesthesia ("TIVA") is used versus when non-TIVA is used. The prior art also does not describe an anesthetic method that sufficiently avoids the accumulation of drugs and precludes a patient's retarded emersion from anesthesia. Many of the dose ranges suggested by the prior art are too aggressive and often result in overdosing the patient because of the synergystic effect of combining multiple drugs. In sum, the literature and resources are grossly inadequate in terms of providing anesthesiologists with safe dose ranges for the medications or a method for intravenous administration.

[1] For example, in cardiac cases the patient generally wakes and is extubated several hours after the conclusion of the surgery. In contrast, a patient undergoing an appendectomy wakes and is extubated almost immediately after surgery.

To the extent equations have been propounded that are purported to allow an anesthesiologist to compute appropriate doses for a particular case, those equations are complicated such that their use is limited and result in a variety of computational errors. Many anesthesiologists understand the pharmacokinetic principles of anesthesia through the classic three-compartment model. The three compartment model is used to describe several methods of anesthetic administration. According to the three-compartment model, a drug placed in compartment 1 moves reversibly between compartments 1 and 2 at constant rates $k_{12}$ and $k_{21}$, and between compartments 1 and 3 at constant rates $k_{13}$ and $k_{31}$, until the drug is irreversibly removed from compartment 1 at a constant rate of $k_{10}$. The volume of compartments 1, 2 and 3 are known as $V_1$, $V_2$ and $V_3$ respectively. The movement of the drug between compartment 1 and compartments 2 and 3 is known as "distribution" and the irreversible movement of the drug from compartment 1 is known as "elimination." Elimination of a drug reflects metabolism or excretion of the drug. In an infinite continuous infusion, the steady state concentration of the drug in each compartment is assumed to be equal and thus the total volume of distribution is $V_T$, where $V_T=V_1+V_2+V_3$. The rate at which the drug is removed from the central compartment is directly proportional to the volume of the drug in the central compartment. Thus, the central compartment clearance, i.e., the elimination rate from the central compartment, is $Cl_1$ which is defined by $V_1 k_{10}$. Many equations have been propounded to attempt to quantify the movement of anesthetic drugs in patients according to this model. See e.g. White and Table 1 wherein $V_c$ is the clearance volume which equals the measurable blood level drug concentration of the drug. $V_c$ is inversely proportional to the concentration of the drug in the cells. $V_{dss}$ is the steady state volume of distribution. Unfortunately, this model has several significant limitations. For example, the plasma concentration in the blood often leads the concentration effect on an end organ at induction and lags behind on wake up. The $V_{dss}$ values are depicted herein to permit comparison of White's methodology to the present invention.

The most common existing method for infusing a variety of drugs requires anesthesiologists to determine the doses they intend to give to a patient according to the following cumbersome Equation 1:

$$D \times BW \times 60 = C \times R$$

The variables for Equation 1 are defined as follows:
D=Dosage Rate expressed in µg/kg/min
BW=Body Weight expressed in kg C=Concentration of infusion expressed in μg/ml R=Rate of infusion expressed in ml/hr (Constant=60 min/hr)

Equation 1 includes five "unknowns" (the "C" comprising two variables: the numerator (weight in mg) and the denominator (volume in ml)), requiring that a series of calculations be performed each time a drug mix is prepared and used. These intricate calculations make application of the infusion techniques laborious and increase the risk of human error. The pressures of providing critical health care, coupled with the long and late hours worked by health care providers make desirable any method that reduces the potential for error.

Due to varying body weights of patients, the desired drug flow rates will vary in each case. Accordingly, using the methodology depicted by Equation 1, it becomes very difficult during clinical procedures to re-evaluate repeatedly the dosage of drug the patient is receiving. One method of addressing this problem has been to standardize the drug concentrations. However, a significant problem continues to exist with this method: The delivery rate still varies. Further, the equation fails to consider the synergistic effect when a plurality of anesthetic agents are used which is the normal method of anesthesia, or the needs of a particular type of case, e.g. cardiac.

Thus, under the prior methods, when the anesthesiologist is called to administer to a patient, the anesthesiologist is forced to rely on his memory of the conflicting and inaccurate safe dose ranges for the drugs that he intends to use in the modality he intends to administer them, or the anesthesiologist must attempt to manipulate a cumbersome equation that includes too many variables.

Prior Mechanisms for Anesthetic Administration

The mechanisms that have been developed to administer intravenous drugs, including anesthetic drugs, have been plagued by a host of deficiencies that have impaired anesthesiologists. For example, several methods of intravenous infusion rely on a pump and syringe mechanism for the delivery of the anesthetic drugs. Unfortunately, the syringe pumps used in such mechanisms are neither accurate nor do they effectively deliver drugs in the system when low volumes are required. At low volumes, the drugs to be delivered often languish in the tubing for such mechanisms. In many such mechanisms at least 1 cc of the drug to be delivered stays in the tubing for the mechanism in others, as much as 5 cc remains in the tubing. Second, the syringe volumes used with pump and syringe mechanisms vary among companies. Such variation causes the pump and syringe mechanisms to deliver different dosages of the drugs even when the same titration rate is chosen. Third, the plungers that are used in the syringes are known to be subject to resistance in the cylinder of the syringe. The resistance causes the plunger to advance irregularly in the syringe cavity. The irregular movement of the plunger in the syringe cavity causes irregular drug delivery, i.e., small boluses of the drug(s) are delivered as the resistance is overcome, not a continuous steady amount. Another problem plaguing methods that rely on syringes is that such methods often require reloading the syringe during the procedure.

Other methods rely on computerized delivery systems that automatically adjust the rates to anesthesia requirements. However, such systems are extremely expensive, making them economically impracticable for many operating rooms. Further, the administration of anesthesia is an art as well as a science, and an entirely computerized system cannot entirely replace the need for the administering physician to evaluate, understand and manipulate the factors involved in the application of each drug to facilitate proper adjustment based on the patient's clinical response to the drugs administered, i.e. even "closed loop" systems require the close monitoring. For example, completely closed loop models fail to consider a change in stimulus that is common in surgery. Further, because no method exists for ensuring that a patient is asleep or unaware, closed loop systems are contraindicated. Finally, completely closed loop systems have proven inoperable when multiple anesthetic agents are used.

Infusion pumps are also well-known, although the expense of these devices can be prohibitive in many clinical settings. See "Infusion Pumps," *Milestones in Anesthesia*, pp.2–3. See also, Burtles, Richard; "Continuous Infusion Of Drugs: A Simple And Rational System," *Journal of Cardiothoracic and Vascular Anesthesia*, 1991;5(4): 362–364; Tilden, Samuel and Hopkins, Robert L.; "Calculation Of Infusion Rates Of Vasoactive Substances," *Annals of Emergency Medicine*, 1983;12: 697–99. Finally, many intravenous delivery mechanisms and methods require time-consuming and expensive setups. For example, if multiple anesthetic agents are used, multiple infusion pumps are necessary.

A variety of patents and other references disclose methods and apparatuses for the preparation and administration of intravenous anesthetic drugs.

U.S. Pat. No. 4,853,521 discloses a system for verifying and recording drug administration to a patient, including computerized system to run delivery.

U.S. Pat. No. 4,898,578 discloses a drug infusion system that permits resolution of a variety of variables for the commonly used infusion methods.

U.S. Pat. No. 4,058,120 discloses a vaporizer carousel for anesthesia machine.

U.S. Pat. Nos. 4,246,894 and 4,334,526 disclose a method and system for administering a dissociative unconscious type of anesthesia.

U.S. Pat. No. 5,015,781 discloses an anesthetic compound and method of preparation.

U.S. Pat. No. 4,917,670 discloses a continuous spinal anesthesia administering apparatus and method.

U.S. Pat. No. 4,873,076 and similar references disclose a method of safely providing anesthesia or conscious sedation.

U.S. Pat. No. 4,825,860 discloses a device for supplying anesthetic dispensing systems.

U.S. Pat. No. 4,053,604 discloses a method for improving anesthesia mixtures and compositions.

Paul F. White, in his article "Clinical Uses Of Intravenous Anesthetic And Analgesic Infusions," *Anesthesia and Analgesia*, 1989;68: 161–71 (hereinafter the "White Paper"), describes clinical applications of continuous infusion anesthesia but does not contemplate the improved methods of the present invention.

It has, therefore, become desirable to develop a method for preparing drug solutions for continuous infusion that does not suffer from the shortcomings of prior methods.

SUMMARY OF THE INVENTION

Generally, the present invention is a method for preparing a drug solution for continuous infusion which provides for the following steps: establishing a standardized dosage range; establishing a standardized rate range of infusion; and determining the required concentration of the drug on the basis of the weight of the patient, the standardized dosage rate and the standardized rate of infusion. Preferably, these steps are repeated for a number of drugs at incremental weights to establish a reference table of required concentrations. The concentrations preferably are determined on a per unit milliliter basis to enable easy determination of the amount of the drug(s) to be added to diluent in an infusion bag. Furthermore, the standardized dosage rate is preferably based on a maximum maintenance infusion rate established for that drug.

Anesthesia, prepared according to the present invention, is induced according to standard anesthetic techniques using an appropriate loading dose. The drug used for maintenance anesthesia may also be given as an immediate intravenous premedication, i.e., as a primer, or to induce anesthesia. Skilled, experienced anesthesiologists are aware that "priming" a patient for an anesthetic increases the patient's receptiveness to the anesthesia and allows the anesthesiologist to avoid delivering a large initial bolus to start anesthesia. Delivering a lower bolus amount to induce anesthesia allows anesthesiologists to lessen the chance of delivering toxic amounts of anesthesia and reduces the total amount of anesthesia used to induce the patient. The reduced amount of anesthesia required may reduce anesthesia costs. Thus, a methodology for the administration of anesthesia must provide for the administration of a loading dose that addresses the particular needs of the patient and considers the method to be used to maintain the anesthesia. As in most anesthetic procedures, the loading dose quickly raises the plasma concentration of the drug to the desired level and the maintenance rate replaces the drug lost to metabolism and excretion.

Thus, following induction, a maintenance infusion is started and sustained. Anesthetic requirements vary according to the operative procedure to be performed, the health and condition of the patient, the length of the procedure, and numerous other factors. See Table 1 for a partial list of such factors. These factors are considered in establishing the range of concentration of the drug(s) to be delivered to the patient during the procedure.

Under the present invention, a standardized infusion rate, preferably of 30 ml·hr$^{-1}$, is used as a standard to deliver a high (or "maximum") infusion dosage. However, if the continuous infusion drug is intended to be a supplemental anesthetic agent, the infusion rate is decreased accordingly. FIG. 2 shows a standardized downward titration curve which is used to avoid accumulation of the drug during anesthesia. It also describes the turn-off time to allow the person to awaken as rapidly as possible at the end of surgery. Further, the rate, and thus the amount of drug delivered, often must be adjusted based on the patient's clinical response to the drug(s). The present invention allows the anesthesiologist to adjust for these factors. FIG. 3 provides a reference for the interpretation of low to high rate ranges for ten relevant anesthesia drugs.

TABLE 1

RANGE OF PLASMA CONCENTRATIONS AND PHARMACOKINETIC VARIABLES USED TO DETERMINE LOADING DOSES AND INITIAL MAINTENANCE INFUSION RATES**

| DRUG (TRADE NAME) | Cp ($\mu g \cdot ml^{-1}$)*** | Vc (L · kg$^{-1}$) | Vdss (L · kg$^{-1}$) | CL (ml · kg$^{-1}$ min$^{-1}$) |
|---|---|---|---|---|
| Thiopental (Pentothal ®) | 5–20 | 0.4 | 2.5 | 3 |
| Methohexital (Brevital ®) | 1–4 | 0.3 | 2 | 11 |
| Etomidate (Amidate ®) | 0.1–0.5 | 0.3 | 4 | 17 |
| Propofol (Diprivan ®) | 1–10 | 0.3 | 2 | 30 |
| Morphine Sulfate | 0.02–0.2 | 0.3 | 3 | 14 |
| Meperidine (Demerol ®) | 0.3–2.0 | 0.7 | 4 | 11 |
| Fentanyl (Sublimaze ®) | 0.002–0.035 | 0.6 | 4 | 13 |
| Sufentanil (Sufenta ®) | 0.0002–0.002 | 0.1 | 2.5 | 11 |
| Alfentanil (Alfenta ®) | 0.05–2.5 | 0.15 | 0.7 | 6 |
| Ketamine (Ketalar ®) | 0.5–2.5 | 0.5 | 3 | 18 |
| Midazolam (Versed ®) | 0.05–1.0 | 0.4 | 1.5 | 7 |

As used above Cp = plasma concentration of the drug, V$_c$ = central volume, V$_{dss}$ = steady state distribution and CL = clearance.
**Values derived by averaging data available from the anesthesia and pharmacokinetic literature.
***Factors that determine the clinically effective plasma drug concentration include patient's age, drug history, level of anxiety, type of operation, and supplemental agent.

The present invention may also use an apparatus for determining and/or preparing a drug solution for continuous infusion, which may include:
1. a means for inputting data;
2. a memory means for storing data, the memory means having stored therein a pre-determined dosage rate for the drug and a standardized rate of infusion depending on the use of the drug;
3. a means operable to determine a required concentration of the drug on the basis of the pre-determined dosage rate, the standardized rate of infusion and a patient weight supplied via the input means;
4. a means for displaying the required concentration and/or preparing the final mixed infusion bag of drugs and diluent to be administered;
5. a means for mixing diluent and drug concentrate(s) into a final mixed infusion bag ready for administration; and
6. a means for marking the constituents on the outside of each final mixed infusion bag.

The present method is useful for administering a broad variety of types of drugs, including, but not limited to, anesthetics, muscle relaxants, sedatives, analgesics and cardioresuscitative drugs. This infusion method also can be used in a variety of clinical settings including the operating room, the intensive care unit, pharmacy, outpatient medical and dental facilities. The use of the invention is described herein predominantly as a method for delivering anesthetics but will be understood by those experienced in the art to be useful in the other applications described above.

A preferable embodiment of the invention provides that anesthesia and other drugs to be administered be prepared from vials with pre-measured doses, for patients within a specified weight range, to eliminate calculation and mixing steps that would otherwise be necessary, thereby further reducing the risk of human error and thus further increasing the safety of the infusion. Pre-measured vials of drug concentrate may be bar coded or otherwise encoded with a machine readable data set (e.g. drug type, freshness date, concentration, volume) to insure that the proper drug mix is achieved, reducing if not eliminating the possibility for human error.

Unlike other inventions that dictate specified drug amounts to be delivered irrespective of clinical circumstances, the invention described herein provides the practitioner a range for titration of the amount of the drug delivered and permits the practitioner to adjust the rate of administration, based on patient response, within the computed safe range for the anesthesia being used.

The invention described herein provides a practitioner two opportunities to adjust the calculation of the amount of the drug delivered to the patient. First, after evaluating the maximum amount of drug that the patient can require and withstand, the practitioner adjusts the concentration of the drug(s) added to the diluent in the infusion bag. Adjusting the concentration of the drug placed in the diluent bag means adjusting the default value of the drug that will be delivered to the patient. Thus, the patient's clinical status and predicted anesthetic needs and predicted response plays a significant role in determining the dose to be added to the diluent bag. Second, after the proper maintenance dose has been determined and added to the diluent bag, based on the progress of the case and the patient's actual response to the anesthesia, a practitioner may adjust the amount of drug delivered to the patient by adjusting the titration rate of the delivered drug within the computed safe range of drug delivery determined. This saves time because no further calculations are needed. The high low range provided for by the present invention mimics the clinical practice as closely as possible while standardizing the same.****

****This standardization makes dose adjustments for synergism easier. For example, one can halve the default dose value provided by the program.

Further, the method described herein is easily adaptable for the following anesthetic applications which present unique problems for a practitioner in the art: (1) cardiac cases, (2) pediatric cases, (3) cases that use Propofol, (4) cases in which mixtures of different anesthetic drugs are used, (5) when TIVA is used in cardiac patients and (6) cases involving very heavy patients.

Many anesthesiologists conceptually will understand the present invention by analogy to the vaporizer/percent delivery model.

In sum, the method of the present invention offers a number of benefits over prior methods of mixing and administering such drugs. The standardization of the dosage rate of the present method makes interpretation and application much easier for the physician and much safer for the patient. The present method also allows the use of simpler and much less expensive infusion pumps that are already easily available in the clinical setting. Because the method provides for mixing appropriate and large amounts of the drug, the method avoids the problems caused by reloading the syringe that plague other methods. The method is equally useful in the operating room, intensive care unit, or elsewhere in the hospital environment. Finally, the present method also allows greater flexibility in selection of an agent to use for a continuous infusion of solutions of drugs, including anesthetic or analgesic drugs. Physicians relieved of the difficulties of prior methods of preparing and administering solutions of drugs, including anesthetics, will be encouraged to widen the number of and types of drugs they use for continuous infusions. Physicians are thus able to use the best combinations of drugs with reduced risk of inappropriate dosing.

It is an object of the invention to provide a method for simplifying calculations to be used in continuous infusion systems, i.e., a method that does not require the anesthesiologist to memorize multiple variables for intravenous drugs used.

A further object of the invention is to avoid the accumulation of infused drugs. Because of the use of the simplified calculation, the infused drugs can be titrated easily to avoid such accumulation.

It is a further object of the invention to provide a method for establishing the correct dosage ranges for drugs that are to be infused, which ranges consider the modality of anesthetic drug delivery, the synergistic effect of multiple drugs and special anesthetic needs such as those posed by pediatric and cardiac cases.

Another object of the invention is to provide a more cost-efficient method for infusing drugs that overcomes some of the deficiencies of the existing mechanisms, e.g., lack of an adjustment mechanism for clinical response, irregular drug delivery, and multiple devices and setups when multiple drugs are used.

BRIEF DESCRIPTION OF THE DRAWINGS

The invention will become more readily apparent from the following description of preferred embodiments thereof shown, by way of example only, in the accompanying drawings wherein:

FIG. 5 shows a sample computer screen output and/or final mixed infusion bag label listing the mixing determination;

DETAILED DESCRIPTION OF THE INVENTION

Method of the Present Invention

Figure 1A:
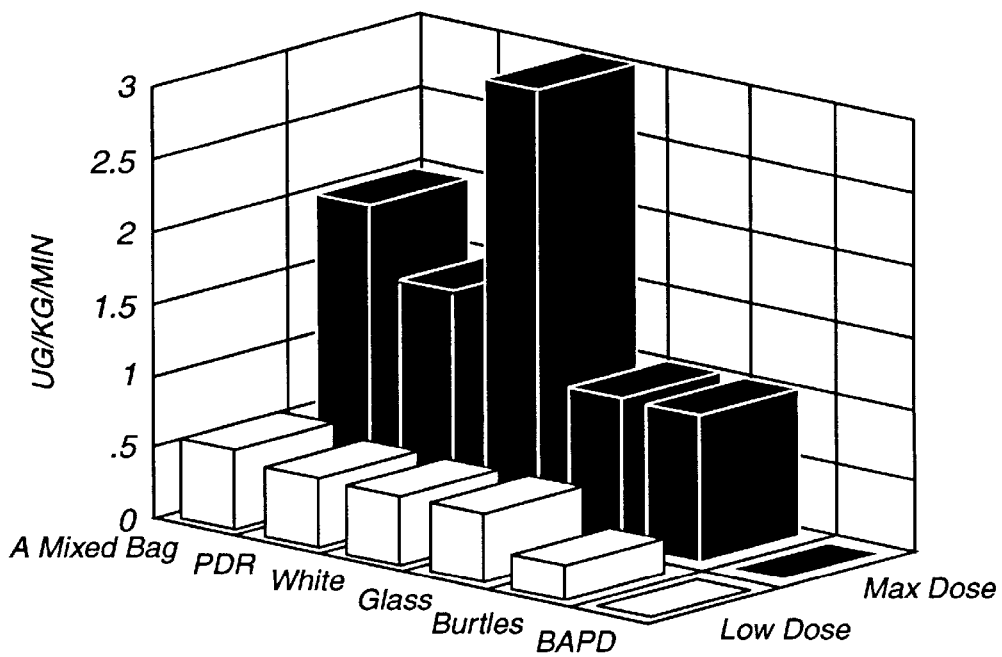
FIG. 1 is a schematic representation of the dose ranges recommended by various literature sources.
Figure 1B:
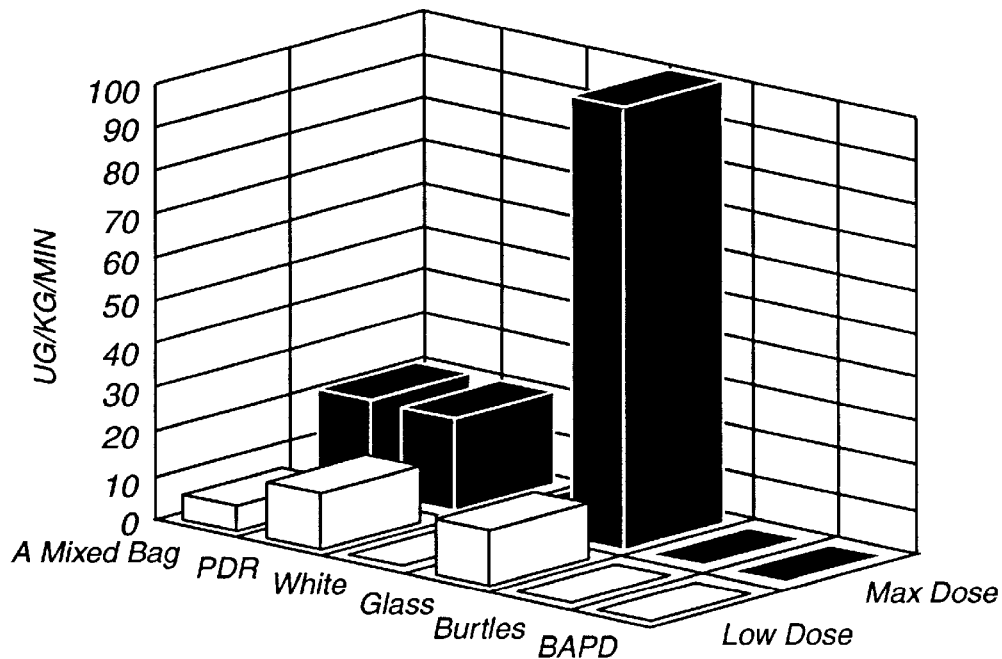
Figure 1C:
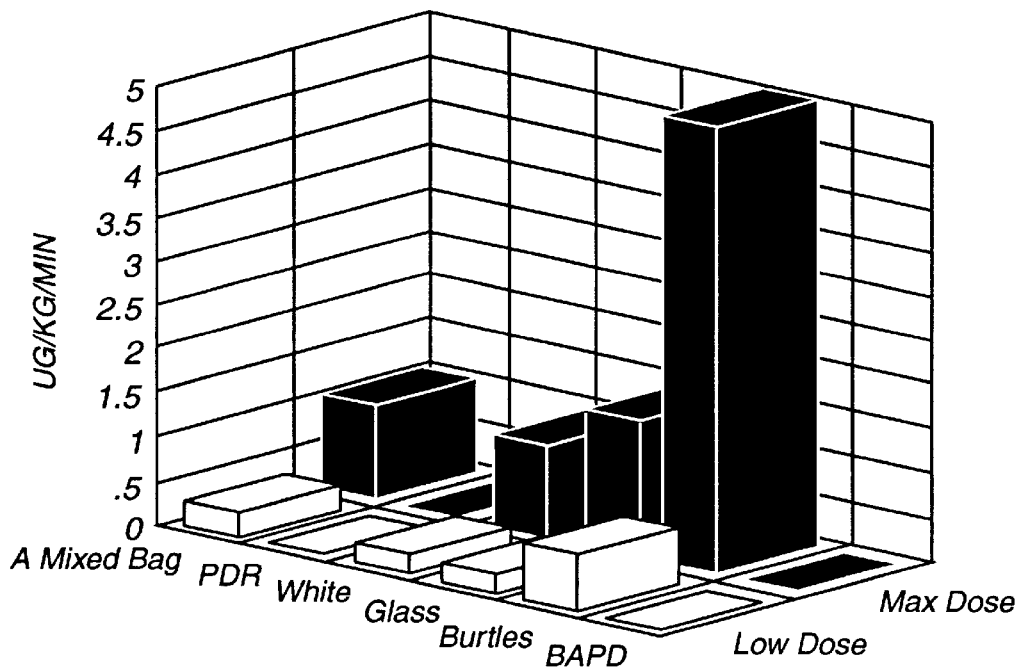
Figure 1D:
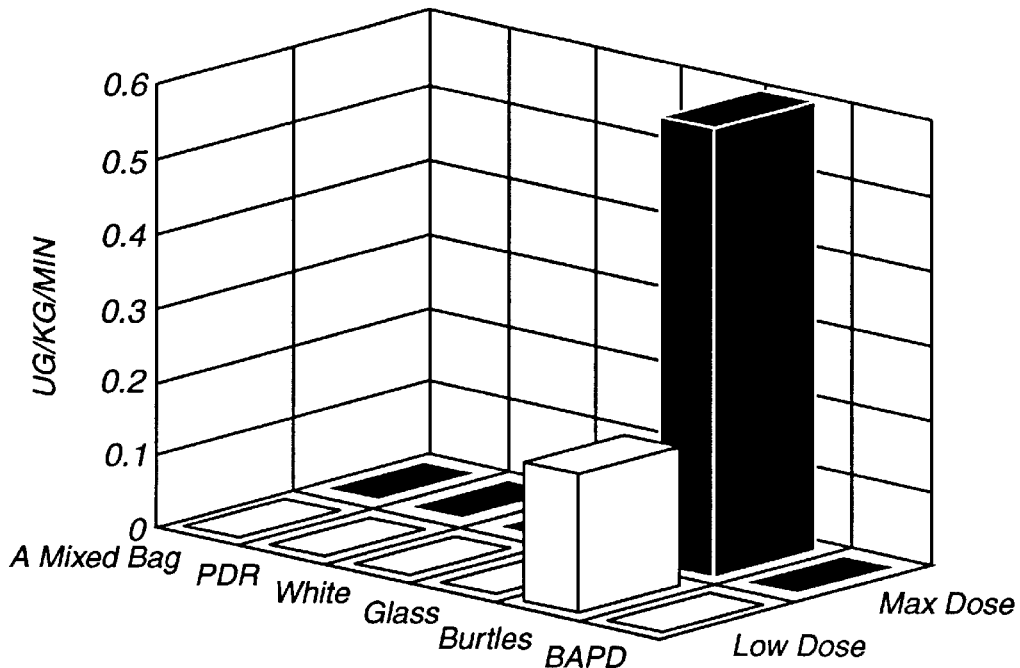
Figure 1E:
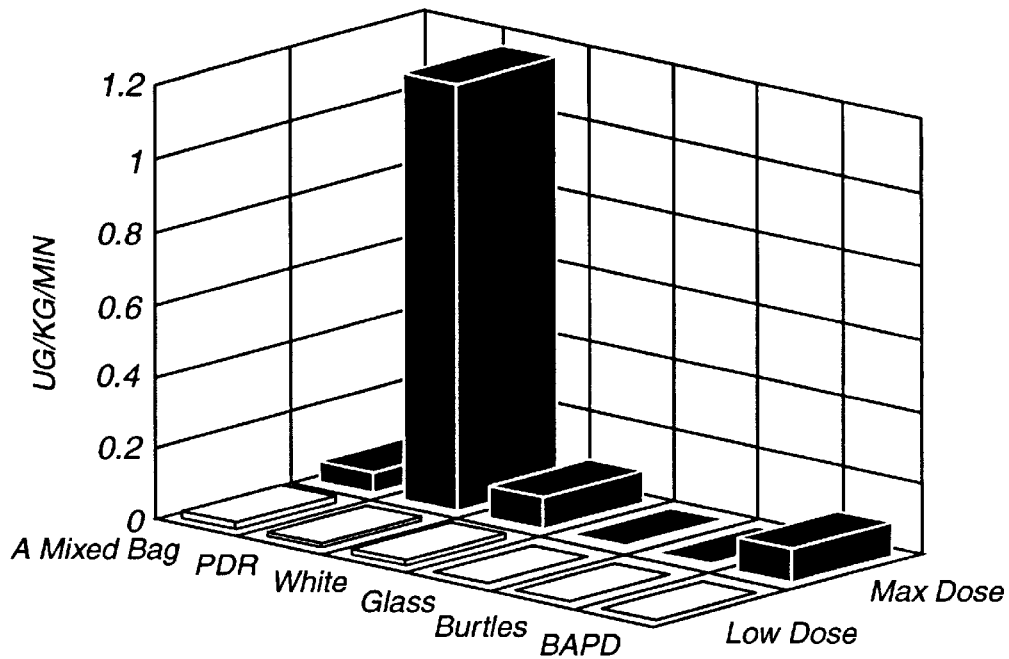
Figure 1F:
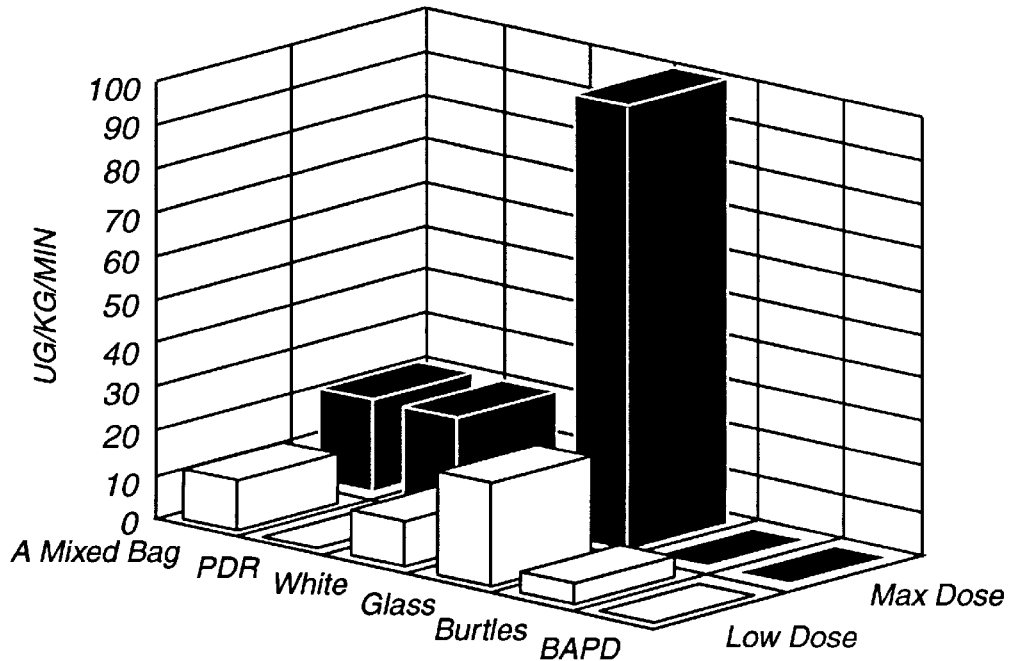
Figure 1G:
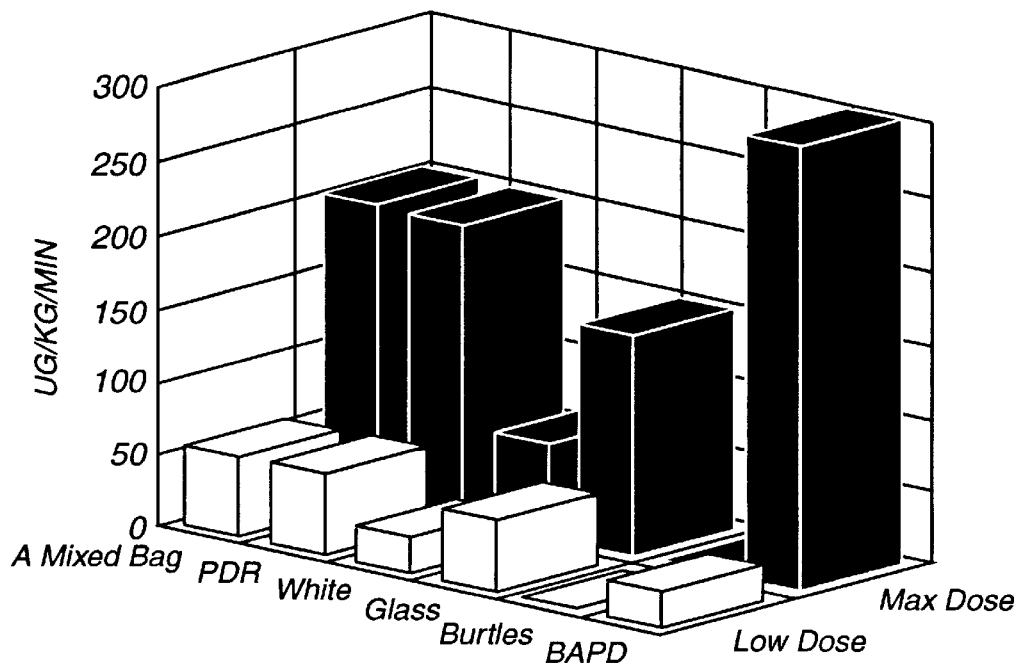
Figure 1H:
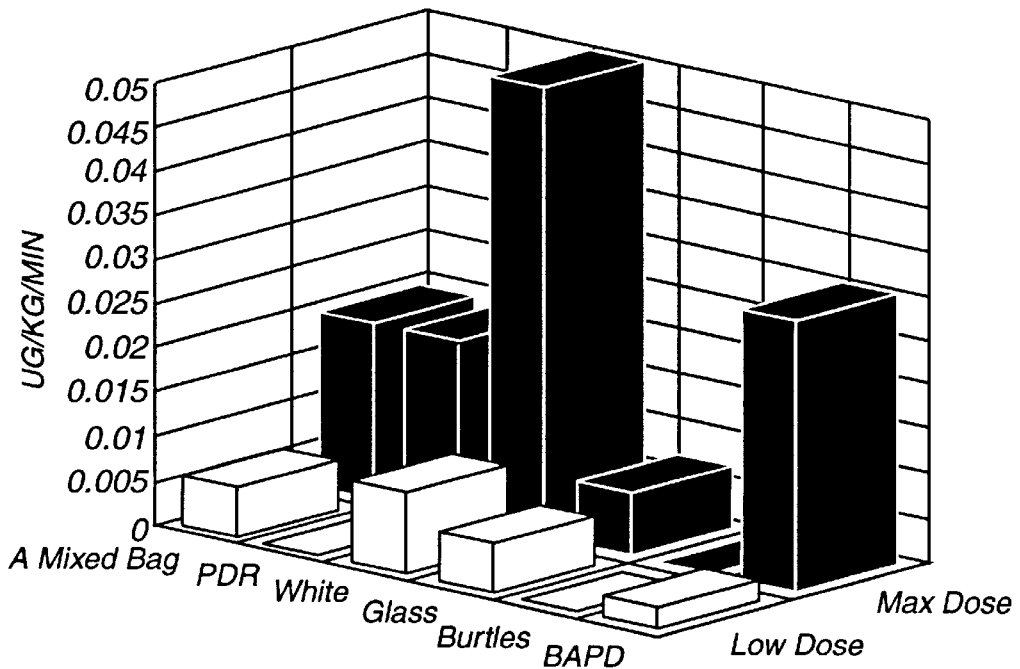
Figure 1I:
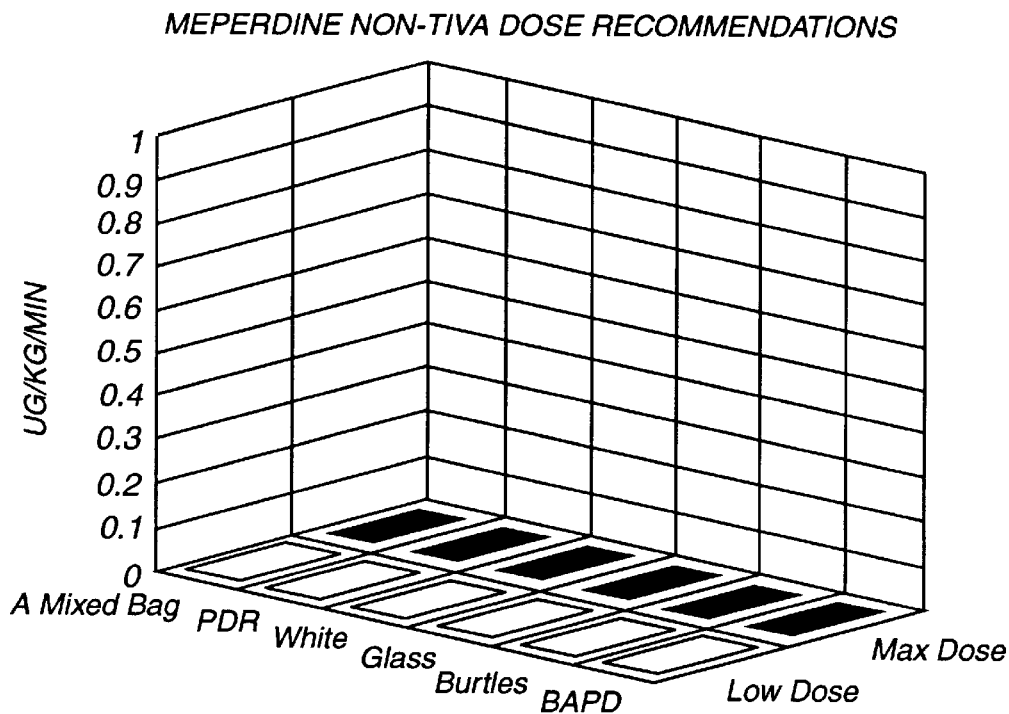
Figure 1J:
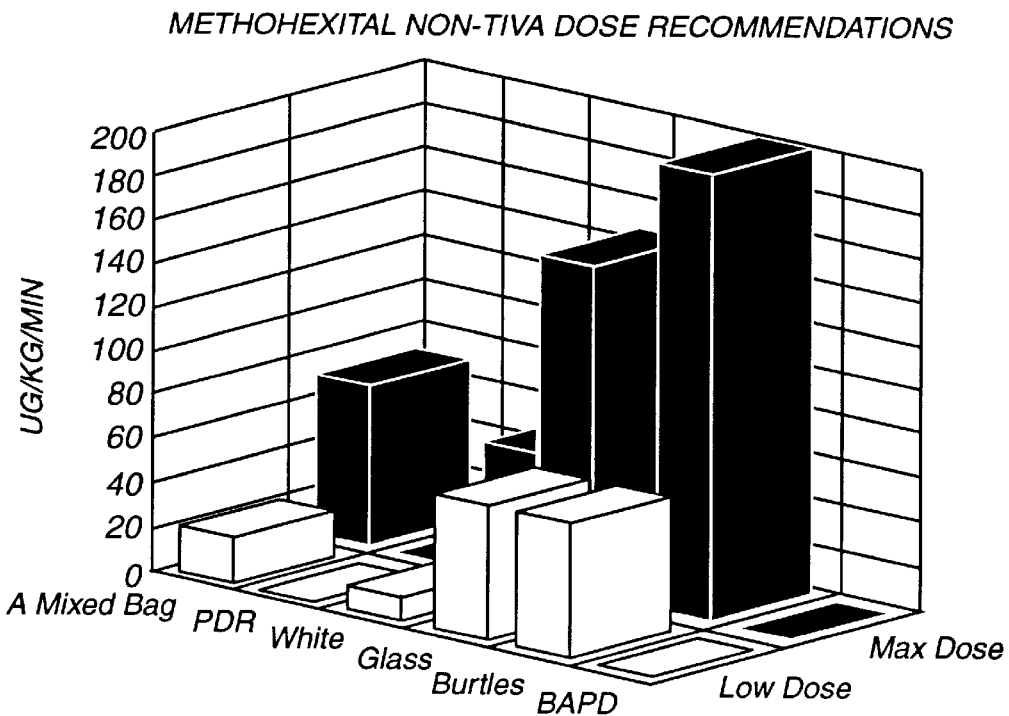
Figure 1K:
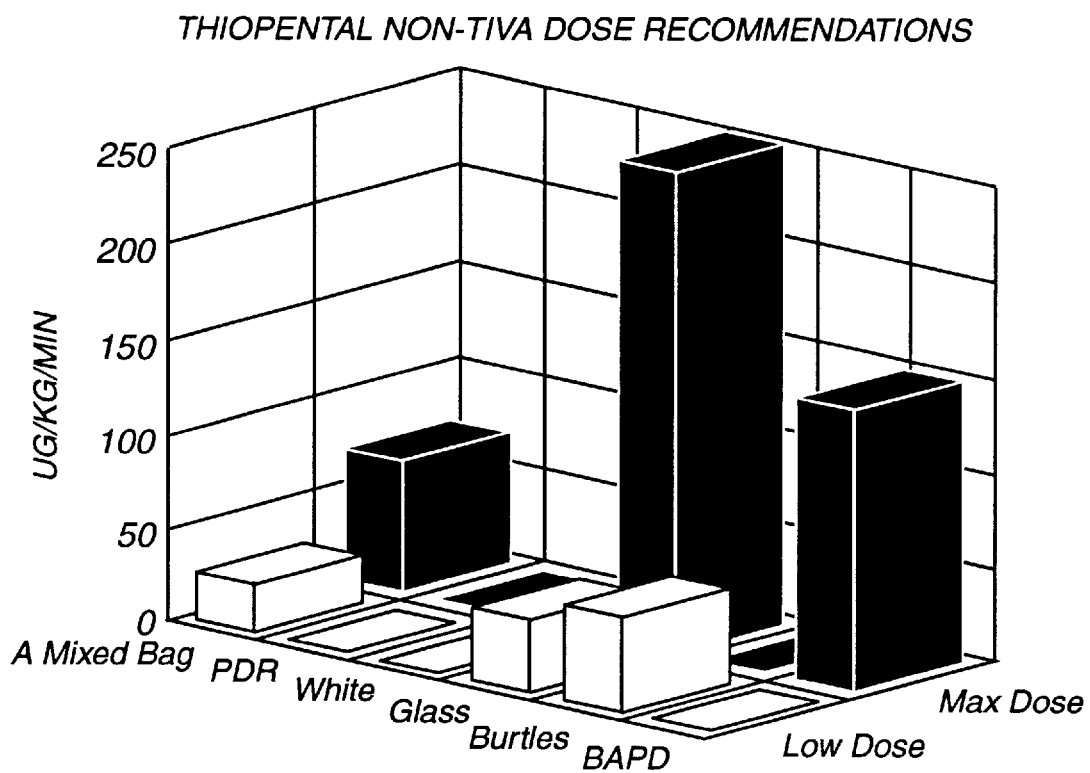

The method described herein, provides for (1) the generation of concentration values, after fixing certain variables as described by the present invention; (2) computation of establishing a standardized titration range of infusion; (3) determining a required concentration of at least one drug based on a patient's weight, said dosage rate, amount of said solution, and standardized rate range of infusion; and (4) mixing at least one drug into a container of diluent for the administration of the drug to a patient.

One feature of the present invention involves the use of a table that has pre-determined values for concentration at various body weights which can eliminate many of the required steps in preparing the infusions, including anesthetics, to be administered. See Table 2 as an example of a table generated, employed in and using the method described herein. Each variable is defined and explained below.

1. Dosage (D)

The White Paper proposes the use of clinically determined high and low values for continuous infusion techniques. Recalling the three-compartment model described earlier herein, the clinical ranges for various drugs are presented in Table 1 under the column labelled Cp. These clinical values were derived by taking the consistent conservative values described in the anesthesia and pharmacokinetic literature. According to the White Paper, the value for Maintenance Infusion Rates (MIR) is determined by multiplying the patient's plasma concentration of the drug (Cp) by the clearance (CL), i.e., the elimination or metabolism rate. The Cp column of Table 1 gives the high and low value range for each agent.

3. Constant

The constant 0.06 corrects for unit of measurement differences between the dosage and the infusion rate (ml/hr).

4. Rate Of Infusion (R)

Nominally, the rate of infusion can be any selected value. However, to simplify and standardize the infusion rates for all the intravenous agents, the present invention sets the rate at 30 ml·hr$^{-1}$ in the preferred embodiment when the method is being used to calculate the maintenance rate in an adult. This rate was selected because most patients requiring anesthesia require that volume of fluid while undergoing a procedure requiring anesthesia. Further, this rate of infusion overcomes the low volume delivery problems presented by methods and mechanisms in the prior art. The standardiza-

TABLE 2

| kilograms | thiopental | methohexital | stomidate | propofol | morphine | meperidine | fentenyl | sufentenil | alfentenil | ketamine | midazolam |
|---|---|---|---|---|---|---|---|---|---|---|---|
| C.° Milliliters per Hour (Volume of drug to be placed in bag per hour intended use) NON-TIVA DOSE | | | | | | | | | | | |
| 30 | 5.40 | 13.50 | x | 36.00 | 0.68 | 0.79 | 2.62 | 0.72 | 7.20 | 3.24 | 1.80 |
| 40 | 7.20 | 18.00 | x | 46.00 | 0.90 | 1.06 | 3.36 | 0.96 | 9.00 | 4.32 | 2.40 |
| 50 | 9.00 | 22.50 | x | 60.00 | 1.13 | 1.32 | 4.20 | 1.20 | 12.00 | 5.40 | 3.00 |
| 60 | 10.80 | 27.00 | x | 72.00 | 1.35 | 1.58 | 5.04 | 1.44 | 14.40 | 6.48 | 3.60 |
| 70 | 12.60 | 31.50 | x | 84.00 | 1.58 | 1.85 | 5.88 | 1.68 | 16.80 | 7.66 | 4.20 |
| 80 | 14.40 | 36.00 | x | 96.00 | 1.80 | 2.11 | 6.72 | 1.92 | 19.20 | 8.84 | 4.80 |
| 90 | 16.20 | 40.50 | x | 108.00 | 2.03 | 2.38 | 7.68 | 2.16 | 21.60 | 9.72 | 5.40 |
| 100 | 18.00 | 45.00 | x | 120.00 | 2.25 | 2.64 | 8.40 | 2.40 | 24.00 | 10.80 | 6.00 |
| 110 | 19.80 | 49.50 | x | 132.00 | 2.48 | 2.90 | 9.24 | 2.64 | 26.40 | 11.88 | 6.60 |
| 120 | 21.60 | 54.00 | x | 144.00 | 2.70 | 3.17 | 10.08 | 2.88 | 28.80 | 12.96 | 7.20 |
| C.° Milliliters per Hour (Volume of drug to be placed in bag per hour intended use) TIVA DOSE | | | | | | | | | | | |
| 30 | 18.00 | 36.00 | 18.00 | 54.00 | x | x | 16.20 | 7.92 | 10.60 | 3.60 | 9.00 |
| 40 | 24.00 | 48.00 | 24.00 | 72.00 | x | x | 21.60 | 10.56 | 14.40 | 4.80 | 12.00 |
| 50 | 30.00 | 60.00 | 30.00 | 90.00 | x | x | 27.00 | 13.20 | 18.00 | 6.00 | 15.00 |
| 60 | 36.00 | 72.00 | 36.00 | 108.00 | x | x | 32.40 | 15.84 | 21.80 | 7.20 | 18.00 |
| 70 | 42.00 | 84.00 | 42.00 | 126.00 | x | x | 37.80 | 18.48 | 25.20 | 6.40 | 21.00 |
| 80 | 48.00 | 96.00 | 48.00 | 144.00 | x | x | 43.20 | 21.12 | 28.80 | 9.60 | 24.00 |
| 90 | 54.00 | 108.00 | 54.00 | 162.00 | x | x | 48.60 | 23.76 | 32.40 | 10.80 | 27.00 |
| 100 | 60.00 | 120.00 | 60.00 | 180.00 | x | x | 54.00 | 26.40 | 36.00 | 12.00 | 30.00 |
| 110 | 68.00 | 132.00 | 66.00 | 199.00 | x | x | 59.40 | 29.04 | 39.60 | 13.20 | 33.00 |
| 120 | 72.00 | 144.00 | 72.00 | 216.00 | x | x | 64.80 | 31.68 | 43.20 | 14.40 | 36.00 |

Under the present method, to generate the dosage values used to determine the concentration values for TIVA which are in turn used for the standardization of drugs to be infused, e.g., the values presented in Table 2, the high Cp value is selected from the range presented in the Cp column of Table 1. Under the method described herein, the high value is always selected so that the infusion will provide the concentration and volume required to supply the highest expected need for the drugs to be infused. Thus, the dosage, D, used to compute the values of Table 2, is based on the maximum maintenance infusion rate (MaxIR) for each drug. Using Thiopental as an example, taking values from Table 1, the Cp high of 20 μg·ml$^{-1}$ is multiplied by the clearance of 3 ml·kg$^{-1}$ min$^{-1}$ which equals 60 mg·kg$^{-1}$·min$^{-1}$. Thus, the dosage for Thiopental that is used to compute the values for Table 2 is 60 mg·kg$^{-1}$·min$^{-1}$.

With respect to non-TIVA dosages, which are also presented in Table 2, a middle range of the values depicted in the White paper were selected and confirmed by clinical observation. Accordingly, the C* values for non-TIVA reflect the lower dosages.

2. Body Weight (B.W.)

Body weight is a fixed value for each individual patient. In Table 2, a column of values is created for each 10 kg increase in patient body weight.

tion of the MaxIR dosage with a rate of delivery makes the application of all intravenous infusion anesthetics consistent. This standardization of the rate of infusion is a critical feature of the method described herein that distinguishes it from methods of the prior art. Note that the rate of infusion is set at other rates in other embodiments of the invention. For example, the MaxIR is 10 ml/hr in pediatric cases, 120 ml/hr in adult cases involving the use of Propofol, 40 ml/hr in pediatric cases involving Propofol, 45 ml/hr in cardiac cases, and 9 ml/hr in cases in which the drugs to be used are for sedation or analgesia only.

5. Concentration Of Infusion (C)

The concentration of the infusion mixture is given in mg/ml.

6. Volume of drug to be delivered per hour (C*)

The volume of the drug to be delivered per hour, C*, is C divided by the standard concentration at which the drug is commercially available and is given in ml/hr. The values depicted in Table 2 are equal to C*.

Generation of Concentration Values; Table 2 Determination

For purposes of demonstration, and consistent with the foregoing description, the following assumptions have been made:

D=MaxIR expressed in μg/kg/min

BW=Fixed Weight Per Column expressed in kg
R=30 ml/hr
C=Concentration of infusion expressed in μg/ml To determine the volume of the drug to be delivered in its standard available concentration, C*, C is simply divided by the standard concentration at which the drug is available.

Using Equation 1, i.e., D×BW×60=C×R and solving for C* (for each drug at each kg of weight), a table such as Table 2 is generated. For example, using the computation above (generally Cp times Cl) for the D to be used in generating the values for Thiopental, and selecting BW=50 kg, C* is calculated as: (60 mg/kg/min)(50 kg)(60 min/hr)/30 ml/hr= 6000 mg/hr, and because Thiopental is available in a concentration of 200 mg/ml, C* is 30 ml/hr which is depicted in the 50 kg weigh column of Table 2. Selection of (1) the desired intravenous agent by row and (2) the kg weight of the patient by column, allows the practitioner to choose C*. C* equals the volume (expressed in ml) of the relevant drug to be added to the infusion bag to be delivered per hour. This mixture will deliver the MaxIR if the infusion pump is set to deliver the MaxIR, i.e. 30 ml per hour in the preferred embodiment.

The MaxIR used to generate a C* value under the method described herein reflects the special cases described above. For example, because of Propofol's properties, the MaxIR for Propofol must be increased to 120 ml·hr$^{-1}$, to generate the values for Table 2 for the drug Propofol. Similarly, because of the patients' relative drug naivete, the MaxIR used to generate the value for Table 2 in pediatric cases is 10 ml/hr. The MaxIR for other such cases are discussed above.

After the generation of C* values, the method provides for a multi-step preparation of an infusion bag. It will be clear from the following that although the rate and dosage values are set as described above for purposes of generating the C* values, the rate and dosage values are varied under the other steps of the present invention to adjust for various clinical circumstances, e.g., poor patient health and a non-TIVA delivery modality.

Procedure 1: Loading Dose Determination

A) Select BW-[ ]kg
B) Choose intravenous agent loading dose from Table 3.

|  | Loading Dose |  |  |  |  |
|---|---|---|---|---|---|
| High Dose | [ ] · [ ] kg = [ ] mg |  |  |  |  |
| Average Dose | [ ] · [ ] kg = [ ] mg |  |  |  |  |
| Low Dose | [ ] · [ ] kg = [ ] mg |  |  |  |  |

Table 3 gives high and low dose ranges for the agent. The dose range is for use of the drug as a primary anesthetic. If the drug is to be a supplemental agent, lower doses should be used. The actual loading dose will be determined by the clinician based on the clinical status of the individual patient, with a preference for the highest loading dose the patient can tolerate. Some of the factors to consider in selecting an appropriate loading dose is the patient's age, other drugs being administered to the patient, major organ system disease and the type of procedure to be performed on the patient, e.g., the type of surgery to be conducted. Thus, if the patient is in poor health or is particularly sensitive to anesthetic drugs, the clinician will select the low loading dose. If the patient is in good health and demonstrates a typical response to anesthesia, the high loading dose is selected. General anesthesia is induced by "bolus dosing" the appropriate loading dose.

TABLE 3

| | LOADING DOSE* | | |
|---|---|---|---|
| DRUG SELECTED | HIGH MG · KG$^{-1}$ | AVERAGE MG · KG$^{-1}$ | LOW MG · KG$^{-1}$ |
| Thiopental | 8 | 5 | 2 |
| Methohexital | 1.2 | 0.75 | 0.3 |
| Etomidate | 0.15 | 0.09 | 0.03 |
| Propofol | N-A | N-A | N-A |
| Morphine | 0.06 | 0.033 | 0.006 |
| Meperidine | 1.4 | 0.805 | 0.21 |
| Fentanyl | 0.021 | 0.0111 | 0.0012 |
| Sufentanil | 0.0002 | 0.00011 | 0.00002 |
| Alfentanil | 0.075 | 0.0412 | 0.0075 |
| Ketamine | 1.25 | 0.75 | 0.25 |
| Midazolam | 0.4 | 0.21 | 0.02 |

*Table 3 loading dose values are based on the MIR doses recommended in White. For each agent, a Cp plasma concentration high and low range was multiplied by Vc (central volume) to arrive at the loading dose mg · kg$^{-1}$. The ranges depicted here are at the extremes of the high and low does of that used in clinical practice and it is expected that the clinician will make appropriate adjustments based on experience.

Procedure 2: Mixing The Infusion Bag

The infusion bag should be prepared according to the following steps:

| A) | Body weight of patient = | kg = [ ] |
|---|---|---|
| B) | Select intravenous agent(s) | Agent = [ ] |
| C) | Choose appropriate column and row of Table 2 to select C* for each agent | C* = [ ] |
| D) | Volume of Infusion Bag Required Expected duration of case [ ] hrs × 30 ml/hr | ml needed = [ ] |
| E) | Volume of Agent(s) Required duration of case × C* | ml* of Agent(s) [ ] |
| F) | Remove ml* amount from infusion bag | |
| G) | Add ml* amount of intravenous agent(s) to infusion bag. | |
| H) | Label bag and mix diluent and drug(s) | |
| I) | Hook up bag to infusion device that delivers 1–150 ml/hr. | |

(Note: If multiple drugs are used, clinical experience has shown that to adjust for the synergistic benefit of the delivery of multiple anesthetic drugs, anytime that the anesthesiologist uses a narcotic, one practicing the invention described herein halves the amount of the second drug that would otherwise be computed at step C. Note also that most drugs are sold in standard concentrations. Nonetheless, at step F, the method provided for herein allows a practitioner to complete the computations using various drug concentrations.)

Importantly, in contrast to the methods proposed by the prior art, the present invention uses only one bag for the mixing and delivery of the intravenous anesthetic drugs. Thus, in addition to the efficiency such a method provides for the titration of the intravenous drugs, the present invention uses time and hard resources, e.g. pumps, syringes and bags, more efficiently than the prior methods. Because a plurality of drugs can be used in the same bag, the method described herein (a) saves time with set up including calculation, mixing and equipment orientation time; (b) uses one IV setup; (c) uses one pump setup; and (d) saves money by using less equipment. For example, because syringe pumps do not allow delivery of more than one drug, if multiple drugs are required, an infusion method that requires a syringe pump will require multiple syringe pumps which would be expensive and cumbersome. Further, the method described herein is safer than syringe methods because researchers have reported that syringe pumps deliver inaccurate and irregular volumes when anesthesiologists use syringes of different sizes and manufacturers because of the varying lumen size and resistance to motion. Further, when such mechanisms are used and a low volume of infusion is required the drug often cannot be forced through the tubing of the mechanism in a consistent manner. When larger volumes are delivered, as per the method provided herein, the possibility of such inaccurate and irregular drug delivery is reduced. In addition to the advantages stemming from the use of one setup for delivery for multiple drugs, the method herein overcomes several disadvantages of the prior art: the method can be used with simpler and less expensive pumps, the method works with all pumps, and there is less refilling of the syringe, a common problem with infusion methods that incorporate a syringe pump. Further, equipment costs and inconvenience are reduced: a computer is not required for infusion, an infuser is not required for the IV, as discussed more fully below, the method works with a laptop or palmtop computer that may perform the calculations, no infusion controller computer is required to do the titration (thus the invention is conducive to manual titration), the method is compatible with all computer infusion systems as a knowledge base for the infusions. Thus, using the method described herein reduces the costs associated with the prior method: recalculation, hospital services when mistakes are made that leave the patient asleep after the operation is completed, a greater number and more complicated equipment, and unused large volumes of standard mix of drug.

Anesthetic Induction and Maintenance/Titration

Anesthesia is induced according to standard anesthetic technique. The appropriate loading dose, calculated pursuant to procedure one above, is given to induce anesthesia. Following induction, the maintenance infusion is started. A plurality of drugs may be used for the infusion. The amount of the drug(s) to be added to the diluent are prepared according to procedure two. After the drugs are added to the diluent, several methods may be employed for mixing the drugs. For example, (1) the container containing all the drugs and diluent to be administered may be shaken; (2) the container may be massaged; or (3) an air bubble machine may be applied. Preferably, the container should be shaken just before it is hung on a "stand" for infusion into the patient. Almost any device that is capable of delivering a well-controlled volume of drug between 1–150 mls/hr may be used to actually deliver the drug. Note also that many of the anesthetic drugs adhere to the tubing used in drug delivery systems and thus tubes that resist absorption should be used.

By using the method described herein, all the drugs may be delivered with the same setup and delivery mechanism, thereby saving set up time, calculation time and equipment costs. At the start of the infusion, the infusion rate is selected to deliver the MaxIR. In the preferred embodiment of the present invention, the MaxIR is 30 ml·hr$^{-1}$. However, if the continuous infusion drug is intended to be a supplemental anesthetic agent, either because multiple drugs are infused or a non-TIVA application is used, e.g., the intravenous drug is given in combination with nitrous oxide or volatile anesthetics, the infusion rate should be decreased accordingly. For example, if Fentanyl is used, the infused amount of anesthesia can be reduced.

Figure 3:
FIG. 3 is a reference for the interpretation of low to high rate ranges for ten relevant anesthesia drugs.
Figure 3:

The desired individual anesthetic administration requirements may vary greatly. FIG. 3 shows the high-low delivery rates which reflect the values presented in Table 4 of the White Paper. Keeping the infusion flow rates within the checkered area delivers the recommended dosage levels of the relevant drug(s). FIG. 3 allows the practitioner to visually evaluate where the infusion falls in the range of the selected high-low maintenance infusion rates.

During anesthetic administration, the MIR should be serially lowered to maintain the lowest tolerable infusion rate that provides adequate anesthesia, analgesia, and lack of awareness. This allows for quicker patient wake up at the end of a procedure. Thus, if a patient's vital signs remain unchanged and stable, the amount of infusion may be decreased as described herein. In contrast, if the patient's blood pressure or heart rate increases, the amount of drug infused can be increased.

A principle advantage of the present invention is that it simplifies the titration of all anesthesia drugs. All the drugs have been combined to be delivered at the same rate and their concentrations have been set to permit simultaneous infusion in the same modality, the only exception being when Propofol is used. Recall that when Propofol is used, the MaxIR is 120 ml/hr and the MinIR is 40 ml/hr. Again, after the initial computation of the loading and maintenance doses, the present invention uses a fixed concentration of all the drugs and variable delivery rate. At the start of the infusion therapy, the concentration of the drugs is based upon the concentration needed to deliver the default maximum dose at the maximum standard rate (in the preferred embodiment, 30 mls/hour). The variation in delivered dose is created by changing the infusion rate (in mls per hour) within the titration range.

The curve of the titration rate range reflects a rapid decrease of the titration rate in the beginning and a tapering thereafter, where the baseline amount of drug initially delivered is x, MaxIR and the lower range of the drug being delivered is approximately x/3, MinIR. In the preferred embodiment, the rate x, MaxIR, is 30 ml/hr, thereby creating a range for drug delivery in which 30 ml/hr is the maximum rate and 10 ml/hr is the minimum rate, MinIR. Although the range of 30 to 10 mls/hour is the most common, the method described herein is clearly adaptable to other applications. For example, in pediatric cases, or other cases in which the patient weighs between 4 kg and 27 kg and thus has significantly lower fluid requirements than an adult of average weight and has drug naivete, the titration range is 10 mls to 3 mls per hour. In cardiac cases the range is 45 ml/hr to 15 ml/hr, in adult cases using Propofol the range is 120 ml/hr to 40 ml/hr, in pediatric cases using Propofol the range is 40 ml/hr to 13 ml/hr, and if the drug is being used as sedation, the range is 9 ml/hr to 3 ml/hr.

With respect to the slope of the hyperbolic titrating curve, experience has shown that if the rate x is decreased by approximately half one hour before the end of surgery, and the drug ceases to be delivered within 30 minutes of the end of the case, the patient emerges from the surgery, i.e., begins respirating spontaneously and returns to a wakeful state, within a short period after the conclusion of the case, but does not emerge so quickly that the case has not been concluded. Rapid recovery from anesthesia avoids the most common complications of intravenous anesthetic infusion; prolonged respiratory depression and wake up. Thus, the infusion technique is better than that described in the prior art because it avoids the massive opioid loading provided by such methods and provides for a more predictable wake up.

Other models do not use a hyperbolic curve to describe the titration procedure, but use a straight line delivery of the drug. Further, other models provide for intermittent delivery of the drug, i.e., intermittent off and on delivery of the drug. Unfortunately, the straight line method fails to reflect the time sensitive context of the plasma half life (i.e. drug accumulation).

The titration curve of the present invention matches the clinical response of the patient to the drug and generally imitates a hyperbolic curve. Unlike other methodologies, the titration curve is not based on the blood level of the delivered drug, but is based on the patient's clinical response. The present invention shows that it is not necessary to have a method of delivering anesthesia that is based on blood level concentrations of the drug.

Figure 4A:
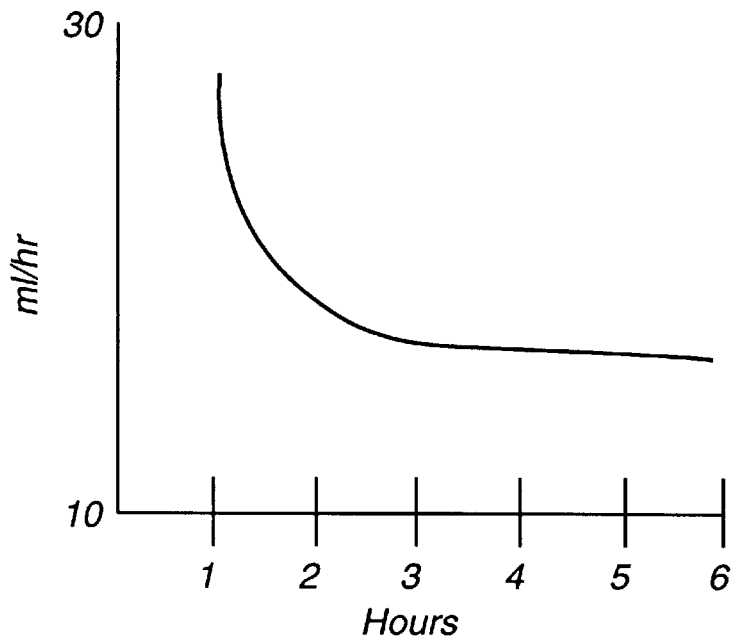
FIG. 4A is a graph showing the titration curve of drug delivery under present invention.

Thus, in the preferred embodiment of the invention for an anesthetic procedure, the titration of the drug(s) occurs along the following schematic curve presented in FIG. 4A.

When the method is used for anesthesia, and the anesthesia provided under the method is the primary agent, use of the higher infusion range is appropriate (20–30 ml/hr). For supplemental or sedative agent applications, use of rates of 10–20 ml/hr would be more appropriate. For mild analgesic effects of the drug, rates of <10 ml-hr would apply. A practitioner can simply adjust the dose according to clinical needs. For example, if the patient appears too heavily sedated, the practitioner can move down the curve more quickly than as prescribed by the usual rate. Conversely, if the patient appears too lightly anesthetized, the practitioner may simply move back up the titrating curve. Again, this method allows for response to the particular patient's reaction to the medication and the properties of the drugs used. For example, although the curve provides a general guideline for the titration of the anesthetic drugs, variations exist depending on whether the anesthetics have fast kinetics or if they have slow kinetics. Anesthetic drugs having fast kinetics required 2 or 3 titrations within the first hour. In contrast, anesthetic drugs having slow kinetics are titrated down a step only once during the initial hour. When drugs having fast kinetics are mixed with drugs having slow kinetics, the mixture is titrated as required for drugs having fast kinetics.

By creating a standard titration range, the use of intravenous infusions is simplified. All the drugs employed are given over the same titration range. All the drugs are tapered in their dose in the same way. See FIG. 4A. For example, at the start of the case, if Drug A is the primary anesthetic, Drug A is given as a bolus and the infusion is started at 30 mls/hour. After 30 minutes the rate is brought down 6 mls/hour to 24 mls/hour. After another 30 minutes the rate is decreased by 4 mls/hour to 20 mls/hour, and so on. This continues until 1 hour before the cases ends where the rate is decreased by ½. Thirty minutes before the end of the case, the infusion is turned off and the patient wakes up. No prior art method suggests, much less teaches this claimed method.

The claimed method standardizes the method for all the drugs. The method simplifies the math involved. When the titration range is 30 ml to 10 mls per hour, the titration curve in FIG. 4A generally is equivalent to the following formula:

$$y = \frac{12}{x^{.75}} + 10$$

Where x=number of hours into the case
Where y=mls per hour
Example 1: x=1 hour $$y = \frac{12}{(1)} + 10 \quad y = 22$$

Example 2: x=4 hours $$y = \frac{12}{(4)^{.75}} + 10 \quad y = 14.24$$

Figure 2:
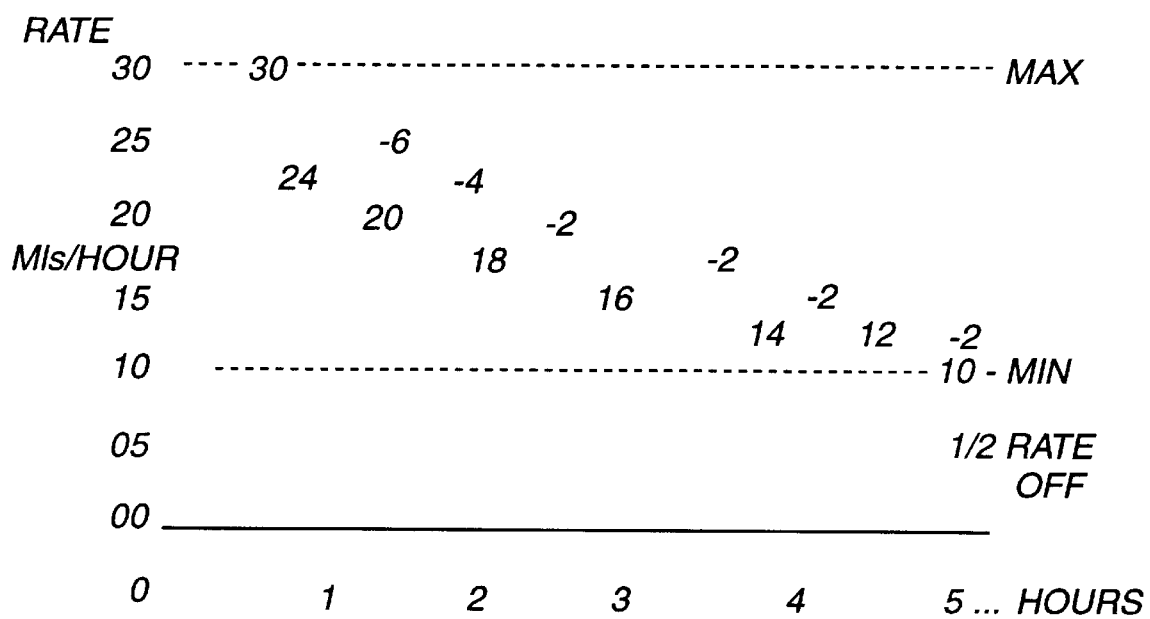
FIG. 2 is a graph showing the standard curve and titration of drugs delivered using the present invention.

Note that the foregoing mathematic model for the hyperbolic curve is not meant to serve as an exact model for the delivery of the drug, but is a schematic representation of the conceptual reduction and titration of the drug delivery rate. FIG. 2 more accurately reflects the titration rate of the drug. The foregoing math model simply shows the curve of a preferred embodiment when no other adjustments in delivery must be made.

Figure 4B:
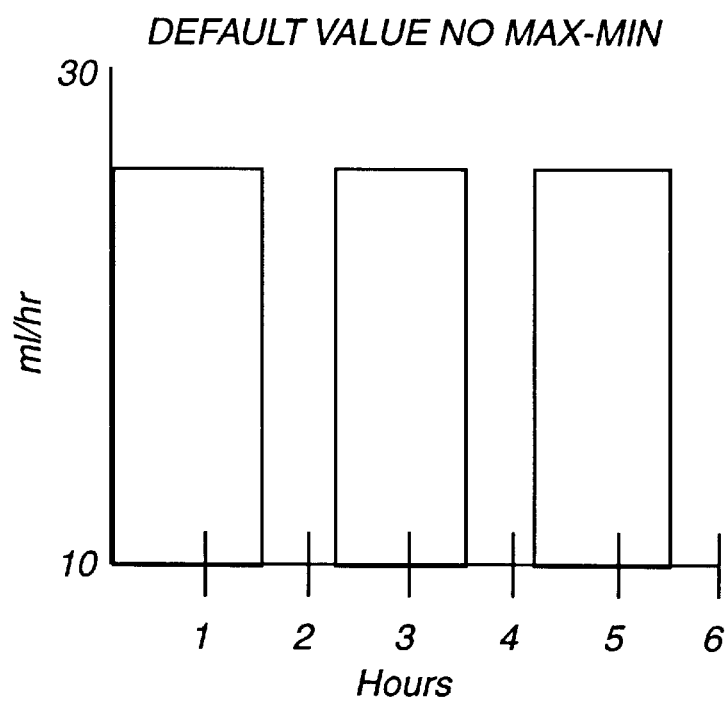
FIG. 4B is a graph showing drug delivery under prior art methods.

Without the standard curve and the standard titration of the claimed method, each rate would have to be calculated independently using the original equation every time a dose needed to be changed. Many anesthesiologists claim that recalculating the infusion rate every time a dose needed to be changed is very difficult and cumbersome and therefore they choose to deliver the drug using the method in FIG. 4B. FIG. 4B shows an "all or none" infusion method. When the drug infusion is given, it is given at a default value. If side effects develop from too much drug, the infusion is shut off. The anesthesiologist then turns the infusion on again when the depth of anesthesia seems too light. Such a delivery method depicted in FIG. 4B as practiced in the prior art is not considered ideal in part because such bolus dosing may require larger total doses of the drug due to the need to maintain intermittently higher plasma concentrations of the drug. The titration permitted by the method described herein is superior to the delivery method depicted in FIG. 4B because it results in lower and fewer peaks, has fewer subtherapeutic valleys, and can make long-acting drugs behave like short-acting drugs. Further, the multi-step titration method provided for herein more closely matches the patient's precise need for drugs, i.e., it approaches the idealized pharmacokinetic delivery of such drugs.

The presently claimed method establishing a standard titration range for all drugs provides a multitude of benefits. There is no recalculation of drug concentration of titration rate during a case.

Example of Administration of Anesthesia

An example using Tables 2 and 3 will now be presented. A 70 kg female must be anesthetized. A Thiopental-Succinylcholine induction is planned. This induction is performed using standard anesthetic techniques. A supplemental Fentanyl infusion will be used for maintenance anesthesia. The duration of the case is expected to be three hours. To determine loading dose of the selected drug (Fentanyl), Table 3 is used.

Procedure 1, the loading dose determination is as follows:
Avg. Loading Dose: 0.0111 mg/kg×70 kg=0.777 mg=777 $\mu$g
High Loading Dose: 0.021 mg/kg×70 kg=1.47 mg=1470 $\mu$g
Low Loading Dose: 0.0012 mg/kg×70 kg=0.08 mg=84 $\mu$g Procedure 2, mixing the bag for infusion drip, is performed:
A) BW=70 kg
B) Agent=Fentanyl
C) C*=5.88 ml/hr
D) Hrs[3]·30 ml/hr=90 ml→will mix 100 ml of infusion bag
E) Volume of agents required=3 hours×5.88=17.64 ml
F) Remove 17.64 ml of fluid from infusion bag containing 100 ml diluent.
G) Add 17.64 ml of 50 $\mu$g/ml Fentanyl to infusion bag containing diluent.
I) Label the bag and mix.
J) Hook up infusion device that delivers ml/hr. Set device to 30 ml/hr to start.

For the induction phase of actual anesthetic delivery, the selected loading dose of Fentanyl will be given as an immediate intravenous premedication or as part of the anesthetic induction. Following the induction phase, continuous infusion of Fentanyl will be started at 30 ml/hr (See FIG. 3). The infusion rate will be titrated to effect using the guidelines suggested in FIG. 4 of White.

After the level of anesthesia is obtained, the rate of the continuous infusion of Fentanyl is serially lowered, as per the hyperbolic curve depicted in FIG. 4A to maintain effective analgesia while minimizing drug accumulation. The infusion should be halved at one hour before the end of surgery, and stopped at 30 minutes before the end of surgery, as tolerated, to allow for quick wake-up. For a more detailed description of the method of continuous infusion anesthesia, the reader is referred to the White Paper.

Computer Program For Determining Drug Mixes

FIG. 5 shows a sample computer screen output and/or final mixed infusion bag label listing the mixing determination. The computer is programmed according to the method outlined above, so that upon input by the user of the requisite data under the method, the program executes the steps of dosage determination for the operator. A computer program using the method described herein is superior to the complex computer driven systems that infuse single drugs with a closed loop control system. Such closed systems imply that manual titration of intravenous infusion systems is too difficult. However, a computer system that uses the method of the present invention is simple, cost-effective and conducive to manual titration, thereby permitting the practitioner greater control. The inventor's computer program for the method described above received FDA-approval.

The results of the dosage determination (including the information shown in FIG. 1) may preferably be printed out on an adhesive-backed label for manual or automatic attachment to the final mixed infusion bag.

Users of the computer program may easily tailor the diluent and drug concentration mixtures to select any standard or nonstandard flow rate, according to the most desirable application of drugs. Such custom mixes result in important patient safety benefits in many special situations such as neonatal anesthesia or others, where specialized flow rates may be required.

Computerized Mix Controller For Preparing Drug Mixes

Figure 6:
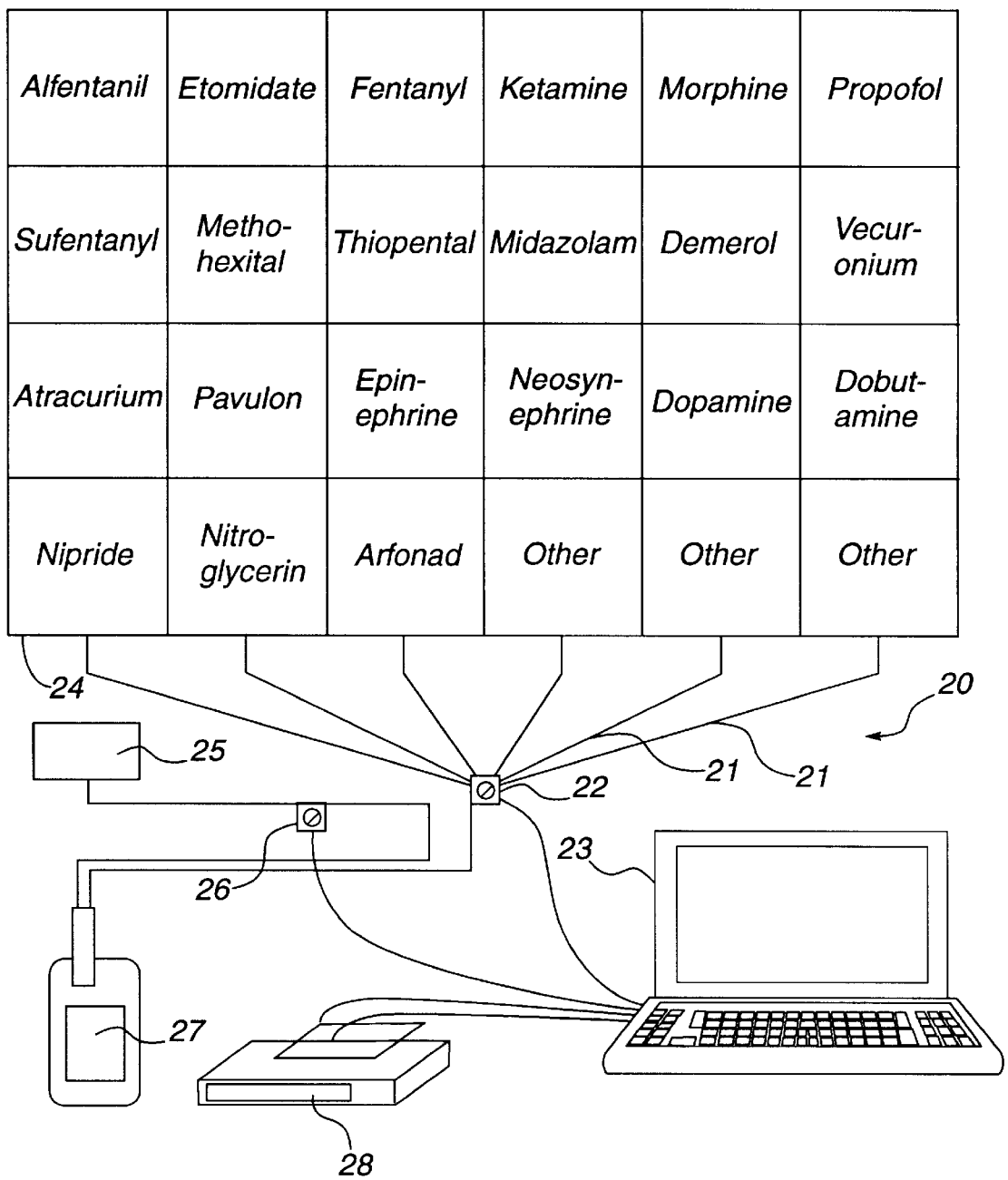
FIG. 6 shows the layout for a computerized mix controller for preparing drug mixes.

FIG. 6 shows the layout for a computerized mix controller 20 for preparing drug mixes. The computerized mix controller is capable of performing the mixing determination, and mixing drugs from drug matrix 24 through supply lines 21 (controlled by multiport drug concentration valve 22) and diluent from vessel 25 (controlled by diluent valve 26) to mix the infusion bag 27 for the practitioner. Computer 23 is preprogrammed according to the method of the present invention so that upon input by the user of the requisite variables, and execution of the appropriate command, the device completes the steps of dosage determination, infusion bag mixing and labeling (as output by automatic label maker 28) for the operator. Computer 23 may also be equipped with an alarm capable of alerting the operator of system malfunction, insufficient quantities of diluent or drug concentrate, program error and/or improper data entry. The results of the dosage determination (including all information displayed on the screen shown in FIG. 1) are printed out by label maker 28 for attachment to the final mixed bag.

The computerized mix controller is equipped with a flow meter-valve system so that upon input of the appropriate command, the necessary diluent is dispensed into the infusion supply bag. The necessary drug concentrates are thereafter dispensed from individual vessels into the infusion supply bag, again using a valve, flow meter or carousel and valve setup. After the computerized mix controller dispenses the final amounts of drug and diluent into the infusion supply bag, the infusion bag may be manually or automatically sealed, and an adhesive-backed label with the final mix information may be manually or automatically affixed to the infusion bag.

Rather than using, as per prior art, a system which requires a complex electronic, pressure or other infusion pump means for each patient for the duration of an operation, the apparatus of the present invention permits a single device to prepare infusion bags at a rapid rate for an entire medical complex or multiple facilities. A hand held, laptop or desktop computer may be used by the practitioner at each patient infusion site or at a centralized location.

Because anesthetic drugs tend to break down over time, the vials containing the anesthetic drug concentrates should most desirably be stored in a temperature-controlled environment before use; the infusion bag may after mixing likewise be maintained in this controlled environment. The computer program is also desirably equipped with a shelf-life monitoring function; when the shelf-life of a drug expires, the operator may be notified, or a fresh drug concentrate vial may automatically be moved into place, and the expired vial automatically disposed. A bar code reader system may be used to monitor expiration date, and to monitor that the correct drug concentrate has been loaded into the automatic mix controller.

Figure 7:
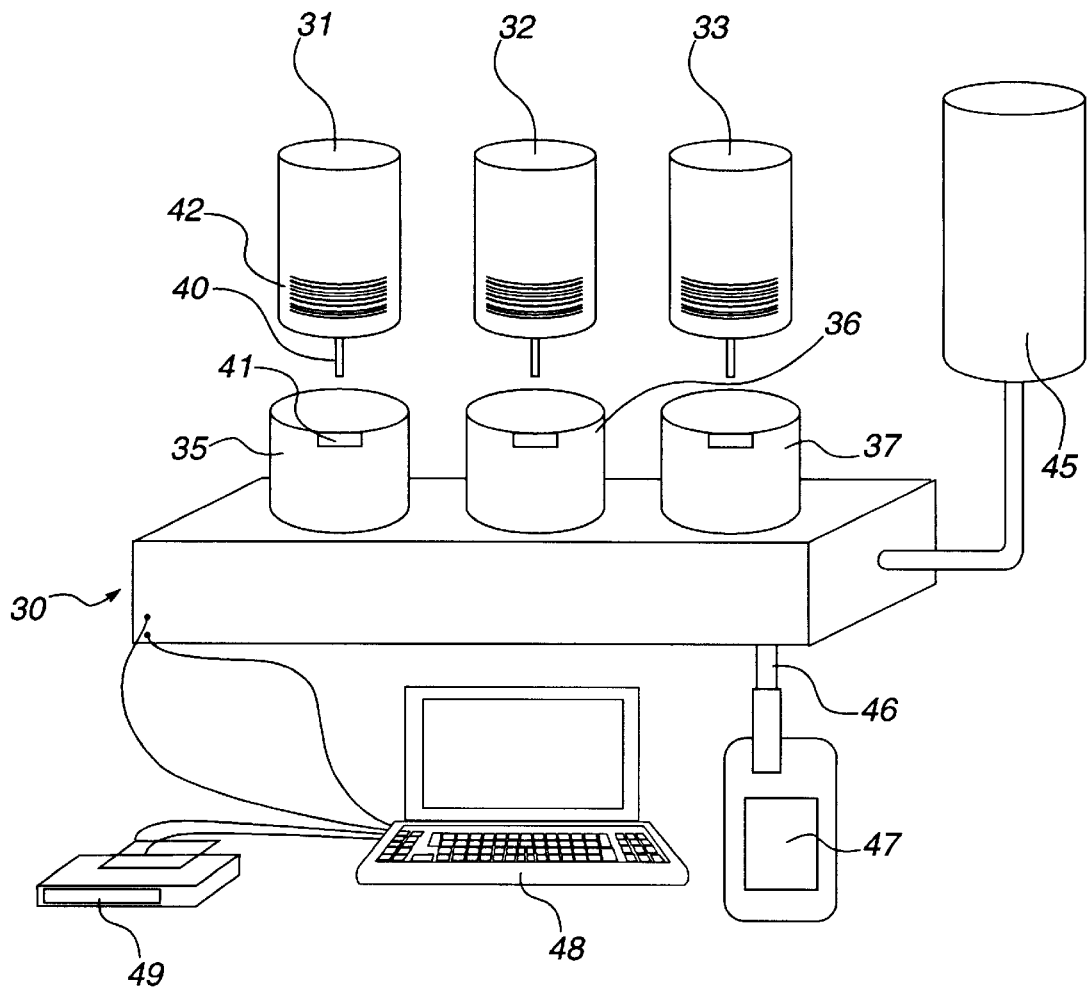
FIG. 7 shows a device for preparing drug mixes.

FIG. 7 shows a device 30 for preparing drug mixes. Drug concentrate vials 31, 32 and 33 are inserted into receptacles 35, 36 and 37. A computer terminal 38 is preprogrammed according to the method of the present invention so that upon input by the user of the requisite variables, and execution of the appropriate command, the device completes the steps of dosage determination and infusion bag mixing for the operator. The results of the dosage determination may again be printed out for attachment to the final mixed bag.

A fluid connector 40 on each drug concentrate vessel permits the drug from each vial to be measured by a valve or flow meter and thereafter pumped or drained through a supply line 46 into an infusion bag 47. A bar code reader 41 monitors the drug type and expiration date of the drug in each drug concentrate vial, as indicated by bar code 42 on each vial. If an incorrect drug concentrate has been loaded into the automatic mix controller 48, or the drug is no longer fresh, an alarm may sound, and/or the device may automatically disable to prevent an incorrect or stale drug from being dispensed. Diluent supply 45 provides the required diluent for the final mixed bag 47. Label maker 49 may manually or automatically apply an adhesive-backed data label to the final mixed bag. The computer is pre-programmed according to the method of the present invention so that upon input by the user of the requisite variables, and execution of the appropriate command, the device completes the steps of dosage determination and infusion bag mixing for the operator. The results of the dosage determination (including all information displayed on the screen shown in FIG. 5) may again be printed out for attachment to the final mixed infusion bag.

SUMMARY

The method and apparatus of the present invention standardizes and simplifies use of continuous intravenous infusion drugs, including anesthesia and analgesia. Institutions that rigorously apply the suggested mixes would standardize all infusion rates for all the listed drugs.

By simplifying the dosage determinations and using the computer and/or computerized mix controller, practitioners are encouraged to use all available agents. The procedure allows for ready mixing of any required volume of an infusion drug. This allows for mixture of an expected volume of a drug for a specific duration case. This results in less wastage of the drug.

The present method is particularly effective for primary or supplemental anesthetic agents, analgesic agents and sedative agents. Descriptions of the clinical applications of continuous infusion anesthesia are set forth in White and are not repeated herein.

Most practitioners are more comfortable evaluating drug usage under the "total dose" concept. Using this concept, the C* (see Table 2) selected (ml/hr) times the total hours given will equal total dose. This may best be visualized by the similar vaporizer/percent delivery concept.

A desirable method and important advancement in the pharmaceutical delivery industry included in the present invention is the use of pre-measured (and standardized) vials of anesthetic drugs, with bar coded data labels. These vials should desirably coincide with the parameters set forth in Table 1. This allows standardized and easier mixing of the drugs for the practitioner. This would again increase safety due to the fact that the drug amounts would be determined by the manufacturer.

When an apparatus (such as a computer, or the like) is used to complete the determination of the required mixes of the various drugs to be used in the method of the present invention, that apparatus may be coupled with a printer to output a label to be attached to the infusion bag. It would also be possible for an automated mixing system to prepare the drug solutions using the pre-mixed vials or similar method of calibrating the required volumes/weights of drugs and diluent to be used in a drug infusion bag.

The method of the present invention can be tailored according to the described formulations to meet specific desired performance characteristics for a wide variety of intravenous drug applications. Although the method for administering anesthesia offered by the present invention has been described in detail in the foregoing for purposes of illustration, it is understood that such details are solely for that purpose and that variations may be made therein by those skilled in the art without departing from the spirit and scope of the invention as described in the following claims.

What is claimed is:

1. A method for preparing a solution with at least one drug for continuous infusion into a patient, comprising the following steps:
   a. determining a dosage rate for a maximum dosage at a standardized maximum maintenance infusion rate for at least one said drug;
   b. establishing a standardized titration rate range of infusion for said solution;
   c. determining a required concentration of at least one said drug based on a patient's weight, said dosage rate, the amount of said solution to be infused, and said standardized maximum maintenance infusion rate; and
   d. mixing in a container said solution having at least one said drug in said concentration determined in step c.

2. The method of claim 1, wherein step d comprises mixing a diluent and said drug according to said required concentration of step c.

3. The method of claim 1 wherein the determination of said amount of said solution to be infused at step c is based on the predicted length of time over which the said solution shall be infused.

4. The method of claim 1 wherein said dosage rate for a maximum dosage is determined for at least one said drug based on said maximum maintenance infusion rate being approximately x and a minimum maintenance infusion rate being approximately x/3.

5. The method of claim 1 wherein steps a, b and c are repeated for a plurality of said drugs, said drugs being commonly used at incremental patient weights, and a table is created indicating said required concentration for each said drug at each said incremental patient weight.

6. A method according to claim 1 wherein a concentration for a plurality of drugs is established at incremental patient weights for use in a software program used to control mixing of each said drug for infusion at each said incremental patient weight.

7. The method of claim 1, wherein step d comprises mixing said drug and a diluent according to the required concentration of step c and said mixing of said diluent and said drug is accomplished by massaging said container, shaking said container or inserting a bubbling device in said container, which method is chosen depending on the physical properties of said container.

8. The method of administering a drug infusion mixture involving
   a. preparing a solution with at least one drug for continuous infusion into a patient, comprising the following steps:
      1. determining a dosage rate for a maximum dosage at a standardized maximum maintenance infusion rate for at least one said drug;
      2. establishing a standardized titration rate range of infusion for said solution;
      3. determining a required concentration of at least one said drug based on a patient's weight, said dosage rate, the amount of said solution to be infused, and said standardized maximum maintenance infusion rate; and
      4. mixing in a container said solution having at least one said drug in said concentration determined in step 3; and
   b. administering said drug and said diluent mixed in step 4 within said titration rate range determined in step 2.

9. The method of claims 5 or 6 wherein vials of each said drug are prepared at an established concentration for each incremental patient weight.

10. The method of claim 1 wherein the said solution is for intravenous infusion of anesthetics.

11. A method for continuous infusion anesthesia of a patient, comprising the following steps:
   a. determining a dosage rate for at least one drug to be infused, based upon the product of the high plasma concentration of said drug according to standard anesthetic references and clearance per unit of body weight of said patient wherein said clearance is derived from standard anesthetic resources;
   b. determining a maximum infusion rate of approximately x based on the type of surgery for which anesthesia is to be administered, the patient's disease status, said drug being used, the patient's weight, and whether said infused drug is to be the primary anesthesia or supplemental to other anesthesia;
   c. determining a concentration multiplier for said drug by the product of said dosage rate times the patient's body weight times 0.06 divided by said maximum infusion rate;

d. computing the amount of said drug to be infused in the patient wherein said amount of said drug is the product of said concentration multiplier times the expected duration of the infusion times said maximum infusion rate divided by the standard concentration available of said drug;

e. preparing an infusion mixture by adding said amount of said drug to a container having removed therefrom an amount of diluent equal to said amount of said drug and mixing said drug and said diluent;

f. determining a standardized rate range of infusion in which said maximum infusion rate is approximately x and the minimum infusion rate is approximately x/3;

g. connecting said infusion mixture to an infusion device for administering said anesthesia to a patient; and h. administering said infusion mixture to said patient over said rate range of infusion.

12. A method according to claim 11 wherein said infusion mixture ceases to be infused into the patient approximately 30 minutes before termination of the procedure for which anesthesia was administered.

13. A method according to claims 1 or 11 wherein said maximum maintenance infusion rate is approximately 30 ml/hr.

14. A method according to claims 1 or 11 wherein said drug is propofol, said maximum maintenance infusion rate is approximately 120 ml/hr and said titration rate range is approximately 120 ml/hr to 40 ml/hr.

15. A method according to claims 1 or 11 wherein the patient weighs between 4 and 27 kg and said maximum maintenance infusion rate is 10 ml/hr.

16. A method for preparing a solution with at least one drug for continuous infusion into a patient, comprising the following steps:

a. determining a dosage rate for a maximum dosage at a standardized maximum maintenance infusion rate for at least one said drug;

b. establishing a standardized titration rate range of infusion for said solution;

c. determining a required concentration of at least one said drug based on a patient's weight, said dosage rate, the amount of said solution to be infused, and said standardized maximum maintenance infusion rate;

d. mixing in a container said solution having at least one said drug in said concentration determined in step c; and e. using a mechanism to prepare said solution, which mechanism has:

(1.) a drug mix station for preparing said infusion container;

(2.) at least one diluent vessel and at least one diluent valve, said diluent valve connected to said diluent vessel for dispensing a quantity of a diluent into said infusion container;

(3.) at least one drug concentrate vessel and at least one drug concentrate valve, connected to said drug concentrate vessel dispensing a quantity of drug concentrate into said infusion container; and (4.) a mix controller for preparing a drug solution, said mix controller being connected operable to each of said diluent valve and concentrate valve to control said diluent valve and concentrate valve for determining a dosage rate for a maximum dosage establishing a standardized rate of infusion and determining a required concentration of a final drug mix based on any solution in said infusion container.

17. The method of claim 16 wherein said drug concentrate vessels are filled with a standard set of intravenous infusion of anesthetics.

18. The method of claim 16 wherein said mix controller dispenses each said drug concentrate according to each incremental patient weight.

19. The method of claim 16 wherein said mechanism further possesses:

(5.) a printer capable of preparing a label listing a final set of mix data for attachment to said infusion bag.

20. The method of claim 16 wherein said mix controller is capable of sensing at least one set of data from a code on an outer surface of each said drug concentrate vessel, said data being selected from the group of freshness date, drug type and concentration level.

21. The method of claim 16 wherein said mix controller also comprises an alarm capable of alerting an operator of at least one malfunction selected from the group of insufficient diluent, insufficient drug concentrate, valve malfunction, program error and improper data entry.

22. A method according to claims 1 or 11 wherein said titration within said rate range of infusion approximates a hyperbolic curve beginning with said maximum maintenance infusion rate at the start of the infusion and ending approximately 30 minutes before termination of the procedure.

23. The method of claim 1 wherein said patient's weight is selected at standard incremental patient weights and 90 ml units of said solution are pre-packaged in bags to deliver said drug in said concentration to patients weighing within a range of said selected standard incremental patient weights.

* * * * *